Patented Mar. 30, 1954

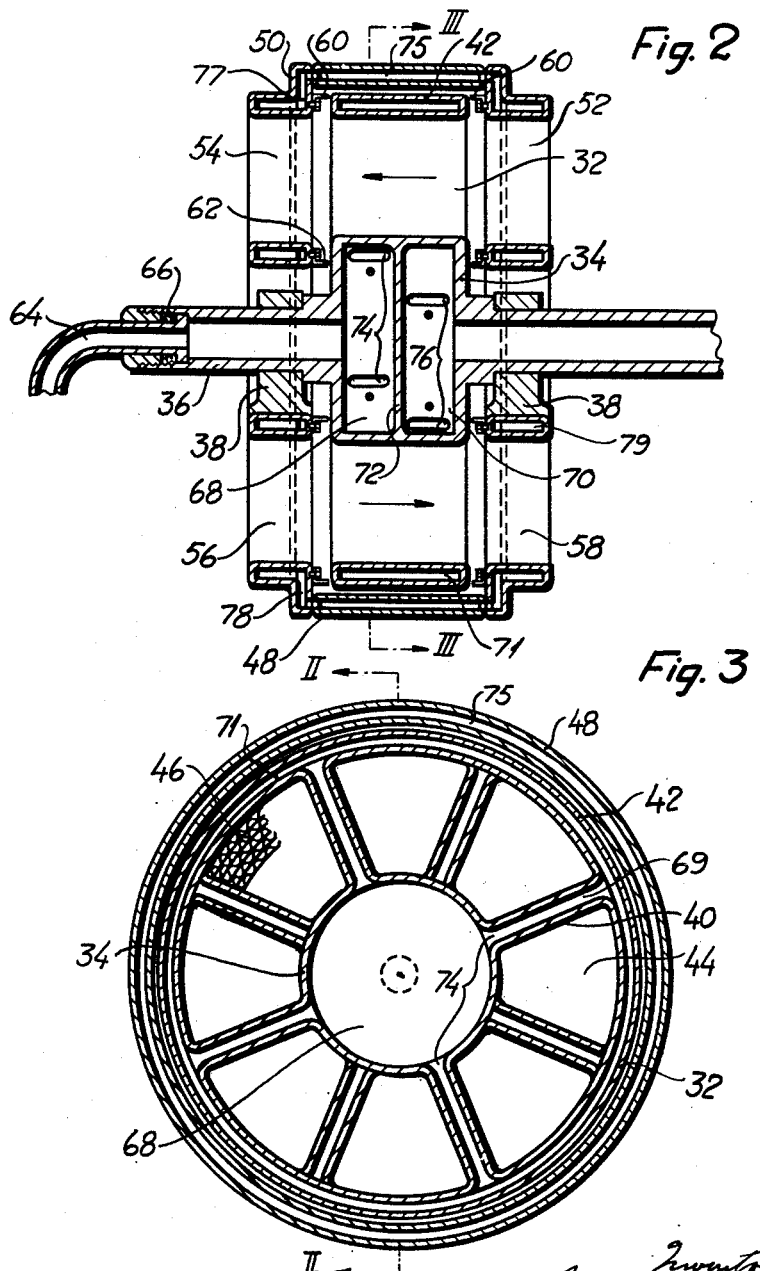

2,673,718

UNITED STATES PATENT OFFICE 2,673,718

ROTARY AIR PREHEATER WITH COOLING MEANS

Fredrik Ljungström, Fiskebackskil, Sweden

Application September 28, 1949, Serial No. 118,380

4 Claims. (Cl. 257—6)

My invention relates to steam power plants and more particularly to plants comprising an air preheater, a boiler and a plurality of superheaters for the steam generated by the boiler. To obtain a good efficiency with plants of this type it is essential to operate with steam pressures and temperatures being as high as possible. High demands are made on the various parts of the plant as well as on the material, of which they are built, from physical, chemical and metallurgic aspects. The composition or character of the fuel has a great influence as far as attacks from the flue gases on the material of the plant are concerned.

It is one object of this invention to provide a plant in which such attacks on the superheaters and air preheater, for instance, are avoided to a great extent even at high temperatures. In the following description an approximate limit value of the temperature in said parts of the plant is assumed to be 650° C.

Another object of my invention is to provide an improved air preheater of the regenerative or so called Ljungström type.

Further objects and advantages of the invention will be apparent from the following description considered in connection with the accompanying drawings, which form a part of this specification, and of which:

Fig. 2 is an axial sectional view taken on the line II—II of Fig. 3, of an air preheater constructed in accordance with my invention, and Fig. 3 is a cross-sectional view taken on the line III—III of Fig. 2.

Figure 1:
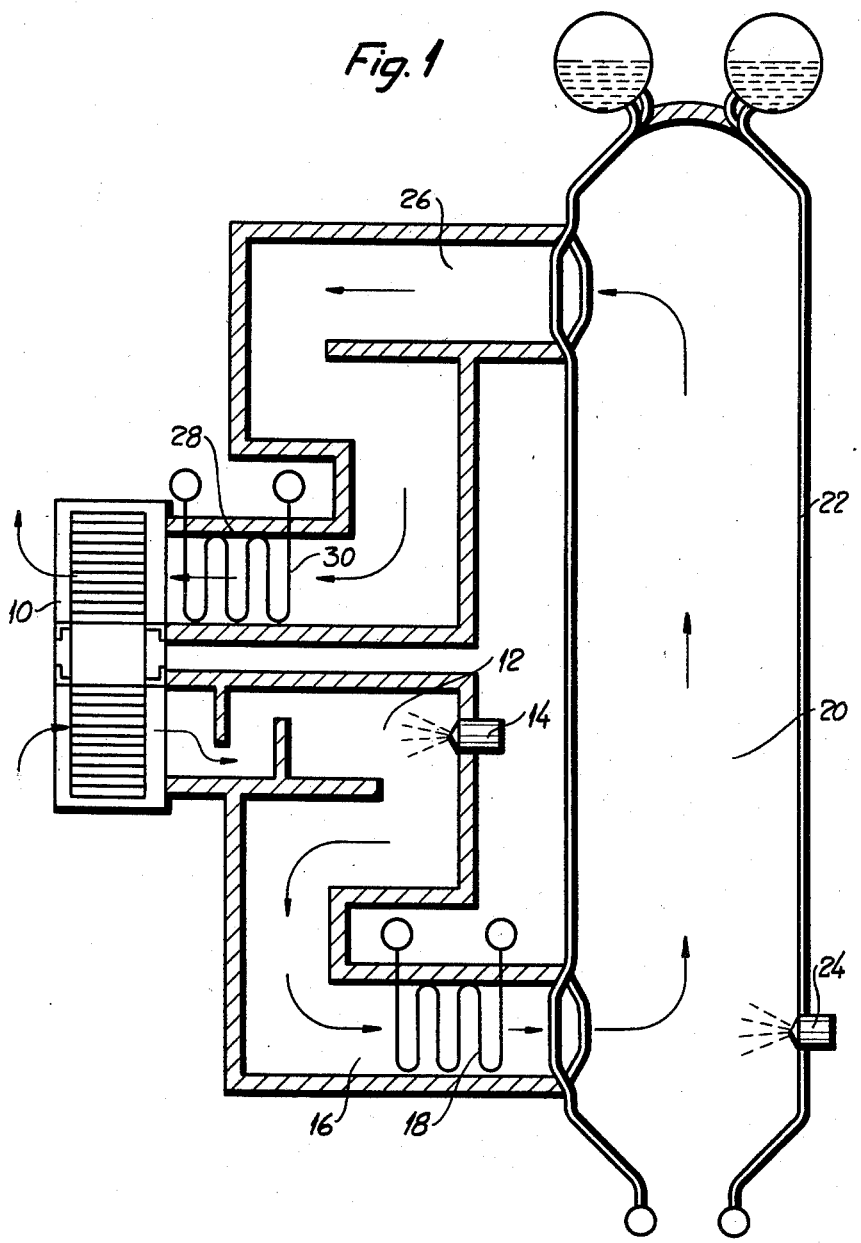
Fig. 1 is a diagrammatic sectional view of a steam power plant made in accordance with my invention.

In Fig. 1 reference character 10 denotes an air preheater comprising a rotational regenerative mass which is adapted to be traversed by fresh air and flue gases in such a manner that said mass upon rotation transfers the heat of the flue gases to the air. Said air enters a pre-combustion chamber 12 including one or more burners 14 for fuel. The walls of the chamber 12 are effectively heat insulated and as there is no heat delivery from the chamber to the operating fluid of the plant, substantially all heat supplied by the fuel is utilized to further heat the air. Preferably only a relative small quantity of fuel is burned in the chamber 12 and in view of the great excess of air, the rise in temperature is moderate. On the other hand the combustion is very complete as the pre-combustion chamber 12 has no relatively cool heat absorbing surfaces.

The air with its content of combustion products thus formed in the chamber 12, passes through a conduit 16, in which a high temperature superheater 18 is arranged which absorbs part of the heat from the air before the latter enters the combustion chamber 20 of a tubular boiler 22 of the radiation type. Said boiler includes one or several burners 24, through which fuel is supplied to the chamber 20.

The flue gases leaving the chamber 20 still have a temperature high enough to permit combustion of any fuel remaining in the same. Such combustion is performed in a final combustion chamber 26, which is of the same character as the pre-combustion chamber 12 is so far as it is well heat insulated to preclude heat absorbing surfaces. The result is that the small amount of fuel still contained in the flue gases is completely burned. Thereafter, the flue gases pass through a channel 28 in which a low temperature superheater 30 is provided. A part of the heat of the flue gases is absorbed by the superheater 30 while another part is transferred to the incoming fresh air in the air preheater 10. After the maximum possible heat energy of the flue gases is in this way extracted, they are discharged through a chimney.

The various parts of the plant above described may be of any known type and it is therefore not considered necessary to describe the same in detail.

To make clear the operation of the steam power plant according to this invention it is assumed that the supply of fuel to the plant would heat the flue gases to 2000° C. in case no heat were extracted from said gases during the combustion and their passage through the plant. Moreover, it is assumed for sake of simplicity that the air and the flue gases have both the same specific heat and that the latter is independent of the temperature. Each per cent of heat fed to the gas will under these conditions raise the temperature by 20° C. A corresponding amount of heat extracted from the gas accordingly lowers its temperature by 20° C.

The steam power plant is moreover assumed to operate as follows:

The air enters the preheater 10 at 40° C. and leaves it at 540° C. In the pre-combustion chamber the temperature of the air is raised to 1000° C. This involves a consumption of $$\frac{460}{2000} = 23\%$$

of the total amount of fuel supplied to the plant. When passing the superheater 18, the air and flue gas mixture is cooled down to 700° C. so that 15% of the fuel heat available is delivered to said superheater.

The air and flue gas mixture now enters the chamber 20 of the tubular boiler 22, where the rest of the fuel amounting to 77% is admitted. Without heat loss the temperature of the mixture would obviously be increased by 77×20=1540° C. to 1540+700=2240° C. However, the surfaces of the radiation boiler are assumed to be so constructed that the flue gases when leaving the chamber 20 have a temperature of 1000° C. With a temperature drop of $$2.240-1.000, \frac{1240}{20}=62\%$$

of the heat represented by the fuel is absorbed in the radiation boiler.

In the final combustion chamber 26 the rest of the fuel contained in the flue gases is entirely burned. The chamber 12 as well as the chamber 26 are preferably so formed that a turbulent flow of the gases is set up in the same. It is assumed that as the quantity of fuel entering the chamber 26 with the flue gases is small, the combustion thereof does not bring up the temperature of the gases in said chamber to any considerable extent. However, this need not be the case, for instance, if the fuel consists of heavy oils. The flue gases together with any remaining excess of air thereafter pass the superheater 30 which may be dimensioned to decrease the temperature of the gases by 360° C. The superheater 30 consequently absorbs 18% of the total combustion heat.

The flue gases thus enter the air preheater 10 at 640° C. and are brought in heat exchange with the fresh incoming air while giving off heat corresponding to a temperature drop of 500° C. The temperature of the flue gases escaping through the chimney is consequently in this example 140° C.

Of the heat represented by the fuel the superheater 18 in the aforesaid example absorbs 15%, the boiler 22 62% and the superheater 30 18% while 5% is lost through the chimney. The efficiency of the plant should accordingly be 95% which of course is not correct on account of the simplified conditions which do not include the heat losses of the boiler 22, for instance, and do not consider the fact that the flue gases leaving the plant have a higher specific heat than the incoming fresh air. As a proper figure 90-92% efficiency may be estimated.

With a steam power plant according to the invention a plurality of advantages are gained. The superheating temperature of the steam may be exactly determined and momentarily controlled by variation of the fuel supply to the precombustion chamber 12 independently of the more or less forced steam regeneration in the boiler 22.

The steam generated in the boiler 22 is further heated in the superheaters 28 and 18, which are traversed by the steam in series and in the order mentioned. The high temperature superheater 18, which the steam may leave at say 650° C. is heated by gases having a great excess of air, a condition which has a favourable influence on the life of the superheater. From a general point of view the attacks from carbon oxide or other reducing gases on the protecting layers of oxide on the pipes or brick work of the plant are according to the invention reduced to a high extent.

The radiation boiler 22 may be constructed without demand on complete combustion but from the point of view of ensuring a radiation effect as high as possible, this because the wall temperature determined by the saturation temperature of the steam is between 200-360° C., where no reduction of iron oxide or other deteriorating chemical reactions commonly occur. Moreover, the great inconveniences are avoided which occur by reason of deposits of unburnt residues on the regenerative mass of the air preheater. Such residues are frequently contained in the flue gases produced in modern radiation boilers and they are particularly dangerous to the air preheater in connection with oil fuel as they involve a considerable fire risk. Very high temperatures may be used in the air preheater and the steam power plant accordingly gives a high efficiency.

The air preheater illustrated in Figs. 2 and 3 generally consists of a rotor 32 which has a central hub or core portion 34 which is secured to a shaft 36. Said shaft is carried by bearings 38. The rotor has a number of radially extending partitions 40 which are secured to the hub portion 34 and a cylindrical drum 42 and which subdivide the interior of the rotor in chambers or sectors 44. The chambers 44 are filled with a regenerative mass 46, such as corrugated metal sheets which provide a great number of channels extending in an axial direction through the rotor and are adapted to be traversed by the fluids in heat exchange relation through said mass.

The rotor 32 is enclosed in a casing including a cylindrical portion 48 and side wall portions 50 having an inlet 52 and an outlet 54 for the one fluid and an inlet 56 and an outlet 58 for the other fluid. The two fluids, in this instance air and flue gases, pass through the rotor according to the counterflow principle. The inlets and outlets for the respective fluids may be positioned on diametrically opposite sides of the shaft 36. In order to reduce leakage of the fluids, sealing means are provided which may consist of circumferentially extending flexible metal strips or tongues 60 secured to the side walls of the stationary casing and being in sliding frictional contact with the side walls of the rotor 32. Radially extending sealing means are secured to the edges of the partitions 40 and are in sliding frictional contact with the side walls 50, to counteract flow of one fluid into the other fluid in a circumferential direction.

Regenerative air preheaters of this general design as hitherto known are subject to great heterogeneous deformations under the influence of the temperature of the fluids traversing the same. In the above mentioned example the flue gases enter the opening 52 at 540° C. and leave the heat exchanger at 140° C. The corresponding temperatures of the incoming air are 40° and 540° C. The right hand side of the rotor 32 in Fig. 2 will therefore be considerably hotter than the other side. The result of this is, that the cylindrical drum 42 takes the shape of the frustrum of a cone having its greater diameter at the right hand side of Fig. 2. Moreover, the lateral face of the rotor or the edges of the partitions 40 assumes a part spherical or circular form instead of the original flat or straight shape. The center of the sphere coincides with the imaginary point of the cone.

The efficiency of a regenerative preheater is dependent among other things on the extension of the regenerative mass in an axial direction. A certain extension in this direction is sufficient for securing desired heat exchange between the two fluids independent of the diameter of the rotor. If now an air preheater which is sufficient for one steam power plant, is to be enlarged sufficiently for another plant having a quadruple capacity, the rotor must be given a cross-section in axial direction, which is four times greater, while the extension of the regenerative mass in an axial direction is unchanged, to ensure the same efficiency of the two units. The larger unit has a diameter which is twice the diameter of the smaller unit. Assuming now that the two rotors in operation are under the same temperature conditions, the drums will be expanded to frusto-conical shape, the points of the cones in both cases coinciding with the center of a sphere which has the same radius in both cases. This will be evident from the fact that the rotor with the double diameter is expanded twice as much as the other rotor. The lateral surfaces of the rotor assume the same curvature while the pitch of the part spherical surface of the larger rotor will be four times as great as that of the smaller rotor. The radially extending partitions 40 are consequently bent to circular curvature having a pitch of the chord which increases as the second power of the diameter.

As the leakage between the stationary and rotary parts of the air preheater is in turn dependent on the deformations of the rotor, air preheaters cannot be built in unlimited sizes while still maintaining a favourable efficiency. It therefore frequently happens that the preheating means of large steam power plants is subdivided into a plurality of units in order to reduce the leakage.

In order to avoid these inconveniences the rotor 32 is provided with passages which are separated from those of the two heat exchanging fluids and are adapted for flow of a fluid in liquid or vaporous state by which the deformations of the rotor under the action of the temperature are controlled so as to avoid irregularities in the clearances between the rotor and housing and consequently to reduce the leakage through the sealing surfaces to a minimum. In the embodiment shown in Figs. 2 and 3 the expansion controlling fluid is admitted to the hollow shaft 36 at one end thereof through a conduit 64, there being packing means 66 of well known kind provided between the conduit and the shaft to allow rotation of the latter. The hub portion 34 of the rotor 32 is divided into two chambers 68, 70 by an intermediate radially extending wall 72. The partitions 40 and the drum 42 are formed by two sheets spaced to confine channels 69, 71 which extend over the whole axial length and periphery of the rotor, respectively. The channels 69 of all partitions 40 open at their outer end into the channel 71. The chamber 68 communicates through openings 74 with every second channel 69 while openings 76 connect the other chamber 70 with the intermediate channels of the partitions 40. Controlling fluid entering through the conduit 64 is circulated through the chamber 68, the openings 74 and the channels 69 connected therewith, to the interior 71 of the drum 42 and radially inwardly through the other channels 69, the openings 76 to the chamber 70 and out through the hollow shaft at the opposite end.

I prefer also to control the temperature of the casing surrounding the rotor 32. In the embodiment shown, the cylindrical and lateral portions 48 and 50 of the casing are jacketed to form channels 75, 77 adapted to be traversed by a controlling fluid. The inlets and outlets 52, 56 and 54, 58 may be formed as collars which have inner passages 79, which communicate with the channels 77 of the portion 50. The inner spaces 75 and 77 of the casing may be interconnected as at 78 or they may form part of separate circulating systems.

The fluid circulating through the inner spaces of the rotor and the casing, respectively, may consist of water or other liquid having a higher or lower boiling point than water. In the embodiment shown the fluid is circulated through the spaces of the rotor 32 and a place outside the same where it may be water- or air-cooled. In the circulating system also a heating device may be provided, so that the fluid may be either cooled or heated before entering the rotor. The rotor is kept at a uniform or substantially uniform temperature in its various parts so that deformations under the influence of the temperature as described above are avoided to a great extent. The circulating system or systems of the casing may be of the same nature. The various parts of the casing may be adjusted to different temperatures which may all or in part be higher than that of the rotor when starting the steam generating unit and the preheater is heated from a cold state. Under normal operation the conditions may be reversed. It is essential that the rotor and the casing be adjusted so that the clearances between the same will be uniform and small. It is also possible according to the invention to keep the surfaces of the air preheater, such as those of the rotor, at a temperature high enough to avoid condensation of moisture from the air, particularly when the air preheater is started or is not in operation. This is of importance in case the flue gases contain substances, such as sulphur compounds, which are deposited on the surfaces of the air preheater and which when wetted attack said surfaces.

While one more or less specific embodiment of the invention has been shown, it is to be understood that this is for purpose of illustration only, and the invention is not to be limited thereby, but its scope is to be determined by the appended claims.

What I claim is:

1. A rotor for regenerative air preheaters including a hollow hub portion divided to form separate chambers, a first hollow supporting shaft part communicating with a first one of said chambers, a second hollow supporting shaft part communicating with a second one of said chambers, a circumferentially continuous hollow outer part, a plurality of radially extending hollow supporting members providing passages and connecting said hub portion and said outer part, said supporting members extending substantially the entire length of said rotor, said passages in said supporting members communicating with the interior of said outer part, certain of said passages communicating with said first chamber and others of said passages communicating with said second chamber, and regenerative mass located in the spaces between said radially extending members whereby temperature modifying fluid may be circulated through said passages to prevent distortion of said rotor.

2. A rotor as defined in claim 1 in which alternate passages communicate with said first and second chambers, respectively.

3. A rotor for a regenerative air preheater having passages for a heating gas and air to be heated comprising a hollow hub portion partitioned to form a pair of separate chambers, a first hollow supporting shaft part communicating with and secured to a first one of said chambers, a second hollow supporting shaft part communicating with and secured to a second one of said chambers, a plurality of radially extending hollow supporting members projecting from said hollow hub portion, said supporting members defining coolant passages communicating with said hollow hub portion, certain of said passages communicating with said first chamber of said hollow hub portion and others of said passages communicating with said second chamber of said hollow hub portion, said supporting members extending the entire length of said hub portion, regenerative mass located in the spaces between said radially extending members, an annularly shaped hollow cylinder coextensive with and surrounding said mass and members and secured to the outer peripheral edges of said supporting members, said hollow cylinder defining a closed annular chamber apertured to permit communication between said annular chamber and said passages, means for introducing a coolant through said first hollow supporting shaft and means for withdrawing said coolant from said second hollow supporting shaft whereby distortion of the rotor due to the passing of the heating gas and air to be heated through the regenerative mass is prevented.

4. A regenerative air preheater comprising a rotor, a stationary cylindrical housing surrounding and spaced from said rotor, said housing provided with end sector plates, each said sector plate formed with a pair of apertures for the flow of heating gas and air through the rotor, a cylindrical shell surrounding and spaced from said housing and forming therewith a closed annular chamber for the flow of a coolant therethrough, inlet and outlet ducts for heating gas and air surrounding said apertures in said sector plates and secured thereto, said rotor comprising a hollow shaft provided with an intermediate hollow hub portion, a plurality of radially extending hollow supporting members projecting from and coextensive with said hub portion, said supporting members defining passages communicating with said hollow hub portion, a partition within said hub portion dividing said hub portion into first and second chambers, certain of said passages communicating with the first of said chambers and others of said passages communicating with the second of said chambers, a regenerative mass located in the spaces between said supporting members, a jacketed cylindrical shell defining a second annular chamber for a temperature modifying liquid surrounding said mass and members and secured to the outer peripheral edges of said supporting members, said second annular chamber being apertured to permit communication between it and said passages, means for introducing a coolant through one end of said hollow shaft, means for withdrawing a coolant from the other end of said hollow shaft and means for circulating a coolant through the annular chamber defined by said stationary housing and its surrounding cylindrical shell whereby distortion of the rotor is prevented.

FREDRIK LJUNGSTRÖM.

References Cited in the file of this patent

UNITED STATES PATENTS

| Number | Name | Date |
|---|---|---|
| 1,762,320 | Wood | June 10, 1930 |
| 2,125,721 | Hartley et al. | Aug. 2, 1938 |
| 2,313,081 | Ljungstrom | Mar. 9, 1943 |
| 2,347,857 | Waitkus | Mar. 2, 1944 |
| 2,392,325 | Kuhner | Jan. 8, 1946 |
| 2,413,645 | Nygren | Dec. 31, 1946 |
| 2,418,815 | Baver | Apr. 15, 1947 |

FOREIGN PATENTS

| Number | Country | Date |
|---|---|---|
| 257,974 | Great Britain | Sept. 13, 1926 |
| 533,780 | Germany | Aug. 19, 1925 |